Jan. 13, 1931.　　　W. E. CLOSE　　　1,788,705
PROCESS FOR ROASTING COFFEE
Filed July 6, 1927
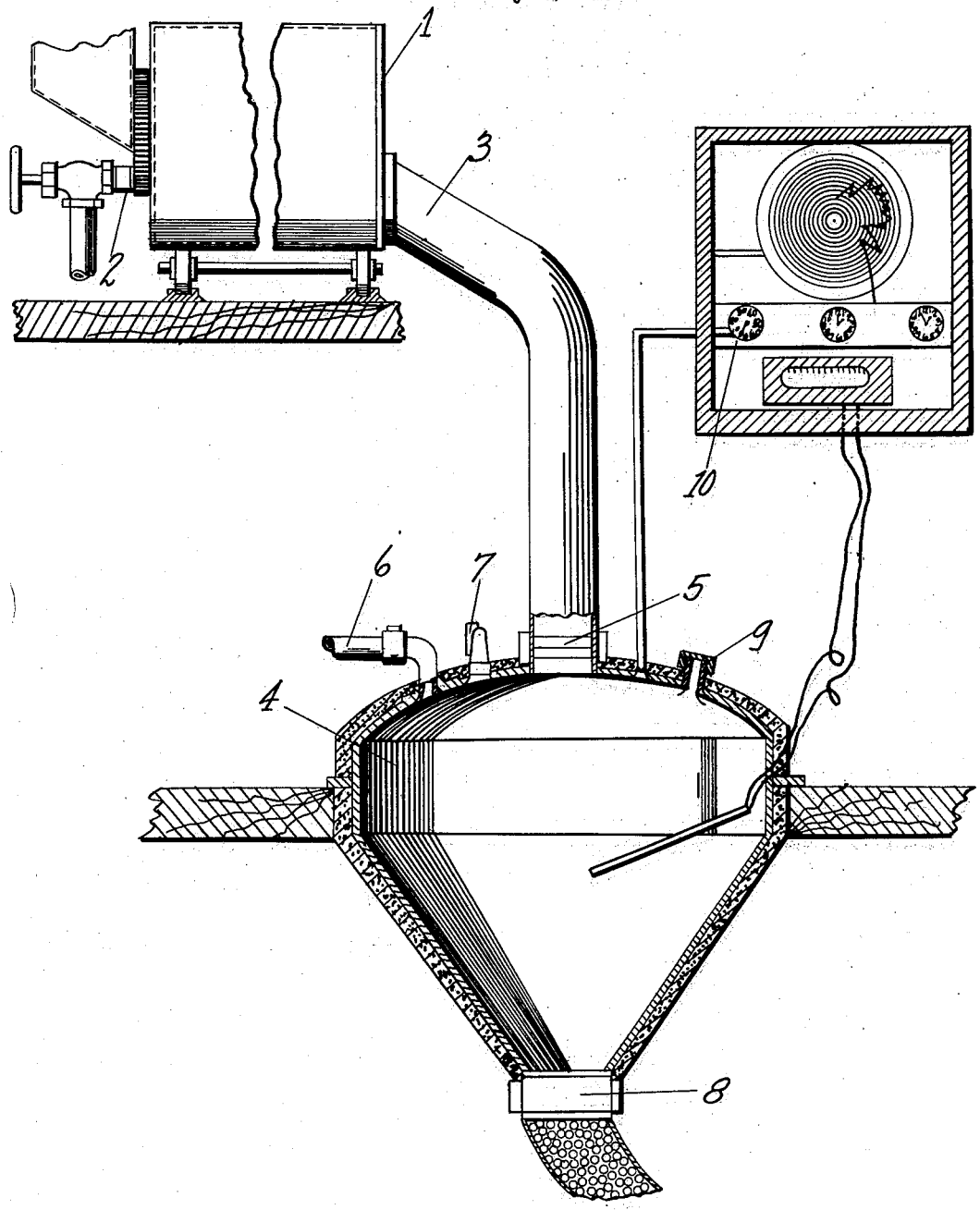
INVENTOR.
William E. Close
BY
Allen Allen
ATTORNEY.

Patented Jan. 13, 1931

1,788,705

UNITED STATES PATENT OFFICE

WILLIAM E. CLOSE, OF LONG BEACH, CALIFORNIA

PROCESS FOR ROASTING COFFEE

Application filed July 6, 1927. Serial No. 203,866.

My invention relates to processes for roasting coffee in order to effect the internal chemical changes which give flavor to the product.

At the present time the process for roasting coffee involves the exposure of the coffee berries to an open flame in a revolving drum which imparts agitation. The changes in composition resulting from the roasting operation begin to take place at a temperature of around 300 degrees Fahrenheit, and this temperature must be increased to effect the complete roasting to a considerably higher degree. The open flame roasting results, however, in the loss of the more ethereal or volatile oils in the coffee, with a resultant lowering of the taste and odor of the product. Also, in the roasting of blended coffees, where the several types of coffee vary in softness, moisture content, texture, and size dependent upon the variety and the altitude and climatic conditions surrounding the growth and development of the berry, there is always present a danger that some of the berries will be roasted beyond the proper time, or at a higher temperature than proper, because of requirements for fully roasting other parts of the blend.

It is the object of my invention to complete the roasting of coffee under pressure, while confined in a steam tight tank, thus avoiding overroasting of some grains in order to get other grains fully roasted, and also confining the ethereal and volatile oils so that they will be absorbed into the coffee instead of escaping. Thus my process is valuable both with regard to roasting of a single type of coffee and batch roasting of coffee blends, and gives a perfectly roasted product without loss of the full savor of the same.

I accomplish my objects by those certain steps of treatment to be hereinafter more specifically pointed out and claimed, and will explain my process with relation to a mechanical arrangement which will be illustrated.

In the drawings, the figure is a diagram showing an equipment for my process of roasting.

In the diagram I have illustrated a revolving drum 1, through which passes the flame from a burner at 2. I have shown a spout 3 running from the discharge end of the drum which passes into an insulated dome 4, shaped like a top, of which the inlet valve is indicated at 5, steam exhaust valve at 6, safety valve at 7. There is a discharge valve 8 for the dome, and an inlet protected by a suitable cap, as at 9 for preheating the dome, prior to its use. I also indicate a steam gauge at 10, and I will use suitable recording and indicating instruments for temperature, time, pressure, etc.

As the first stage of my preferred process I employ the open flame roaster of any desired type, and provide a large hot flame so as to bring the coffee, considering it in the mass to the desired temperature in a fairly short time, say ten or eleven minutes. As soon as the coffee has reached the desired temperature, and I have found that a temperature of around 340 degrees Fahrenheit to be a good stopping point, the flame is stopped and the coffee is passed by usual discharging processes into the dome.

In my preferred apparatus I have provided the dome to withstand a pressure of 100 lbs. to the square inch, and the shape I have given the dome aids in gravity discharge of the contents through the discharge valve. Prior to the discharging of the coffee into the dome I will bring the latter up to around 340 or 350 degrees, so as not to chill the coffee, and while the coffee is running into the dome, I will leave the steam discharge or exhaust valve open to avoid retarding the inflow of the coffee. When the dome is filled, which is done as rapidly as possible, and the inlet valve is made large for this purpose, all outlets are closed so that steam pressure may build up due to the vapors rising from the partly roasted coffee, including both steam and volatile oils.

As the pressure rises, the temperature rises also, and I have found that by the time the pressure reaches 50 lbs. the temperature will be around 375 to 400 degrees Fahrenheit. In my preferred process I hold the coffee in the dome only long enough to build up pressure to 50 lbs., which I can control by setting the safety valve so as to blow at more than 50 lbs.

I then open the discharge valve, and the coffee runs out into the usual type of cooler.

As stated, I find, as a result of the pressure and the building up of some heat, that the required chemical changes in the coffee berry will take place throughout the mass, and also that the berries will absorb the volatile and ethereal constituents to a large degree. The pressure seems to force the heat into the interior of all the berries in a very short time, and whatever moisture is retained in the berries due to the same being filled with steam dries out after grinding, without serious loss of the taste and smell imparting elements which have been saved over the usual open flame roasting process.

It will be understood that I have merely given one example of my process, which was worked out by me for the production of a certain blend of coffees, and that the various heat, time and pressure data given are illustrative of a way to carry out my process, and not as the only way of doing so, because various types of coffee, variations in equipment, and time of transfer, etc., will result in variations in the required treatment, which can be worked out readily by the man skilled in the art of roasting coffee.

Thus, I could employ a continuous system instead of a batch system, using driven rotary valves with pockets in them for inlet and outlet to the pressure dome, and could make the preliminary roasting continuous and make the pressure dome smaller. I could vary my process in a number of ways, as will be obvious, the essential being the bringing of the coffee to temperature, and then confining it so that its own generated vapors penetrate the berry.

Having thus described my invention what I claim as new and desire to secure by Letters Patent is:—

A process for roasting coffee, which consists in raising the coffee to a temperature above 300 degrees Fahrenheit in an open flame roasting step, and then placing the coffee in a pressure chamber, and confining it there so that the pressure and temperature rise to a predetermined amount, and thereupon immediately discharging the coffee to a cooler.

WILLIAM E. CLOSE.